United States Patent
Needham et al.

(10) Patent No.: US 6,711,247 B1
(45) Date of Patent: Mar. 23, 2004

(54) MULTI-LINE TELEPHONE SYSTEM EMERGENCY CALL PROCESSING

(75) Inventors: John Needham, Nepean (CA); Martin Moody, Inver Grove Heights, MN (US)

(73) Assignee: Mitel Corporation, Kanata (JP)

( * ) Notice: Subject to any disclaimer, the term of this patent is extended or adjusted under 35 U.S.C. 154(b) by 0 days.

(21) Appl. No.: 09/304,544

(22) Filed: May 4, 1999

(51) Int. Cl.[7] .................................. H04M 3/42
(52) U.S. Cl. .................. 379/207.14; 379/45; 379/49
(58) Field of Search ............... 379/207.14, 45, 379/49, 50

(56) References Cited

U.S. PATENT DOCUMENTS

| | | | |
|---|---|---|---|
| 5,311,569 A | * 5/1994 | Brozovich | 379/455 |
| 5,347,568 A | 9/1994 | Moody et al. | |
| 5,444,760 A | * 8/1995 | Russ | 379/45 |
| 5,590,184 A | * 12/1996 | London | 379/142 |
| 5,815,799 A | * 9/1998 | Barnes | 455/15 |
| 5,841,848 A | * 11/1998 | Dunn | 379/128 |
| 5,901,209 A | * 5/1999 | Tannenbaum | 379/142 |

* cited by examiner

Primary Examiner—Ahmad F. Matar
Assistant Examiner—Rasha Al-Aubaidi
(74) Attorney, Agent, or Firm—F. Chau & Associates, LLC

(57) ABSTRACT

A system for handling a call requiring non-standard processing to a call answer point and for providing location information concerning the call to the call answer point, comprising a call routing apparatus for identifying the call as requiring non-standard processing and in response providing a priority routing for the call, translation table apparatus for receiving the call via the priority routing and in response assigning a predetermined designation for indicating the location information, protocol harmonization apparatus for formatting the call for digital transmission to the call answer point, including inserting the predetermined designation in an information portion of the digital transmission, and digital interface apparatus for receiving the call properly formatted for the digital transmission and in response transmitting the call to the call answer point, whereupon the call answer point ascertains the location of origination of the call from the predetermined designation.

5 Claims, 3 Drawing Sheets

MULTI-LINE TELEPHONE SYSTEM EMERGENCY CALL PROCESSING

The present invention relates in general to emergency call processing and more particularly to a system for special call handling and providing identification information from a multi-line telephone system to a public safety answering point (PSAP) for a call requiring specific location identification.

BACKGROUND OF THE INVENTION

An important requirement for emergency 911 call systems is the identification of the location of a caller initiating an emergency call. For example, in situations where a caller is unable to communicate with the emergency operator, the automatic identification of the location of the call enables the operator to dispatch emergency services to the physical location from which the call originated.

The identification of the caller initiating an emergency call is rendered difficult in multi-line systems such as PBXs because a plurality of extensions, some of which may be at disparate locations, are all identified by the same pilot number. Thus, it is difficult to pinpoint the exact location of the originating call from among the plurality of extensions.

U.S. Pat. No. 5,347,568 (Moody, et al) discloses a solution to the problem of positively identifying a caller from among a plurality of extensions in a multi-line telephone system. Specifically, a dedicated adjunct (referred to in the '568 Patent as a station translation system (STS)) is connected to the PBX via a dedicated tie line. In response to a user initiating a 911 emergency call, the call is recognized by the PBX as being an emergency call and is routed to the STS, rather than via the normal PBX trunk lines to the central office (CO), which then identifies the calling party station, harmonizes the protocol of the PBX to an ANI (Automatic Number Identification) number which is recognizable by the emergency call network, and routes the call to dedicated trunks in the emergency call network.

Although the system disclosed in the '568 Patent addresses the problem of identifying the location of a station originating an emergency call in a multi-line system, an expensive and difficult interface is required between the PBX and STS, which permanently occupies a slot in the PBX and requires adjunct hardware and special emergency trunks to connect to the emergency network.

Considerable discussion and research has been engendered concerning the desirability of using ISDN (Integrated Services Digital Network) for providing 911 emergency services. Unfortunately, standards committees have thus far been unable to propose an acceptable solution to the problem of how to handle location identification in the ISDN protocol and have not addressed other special needs of an emergency call such as the requirement for guaranteed channel availability. In particular, existing COs typically screen any calling number IDs and other information assigned to a call by a user. Also, with call-by-call service it is possible that all channels may be busy when an emergency call is required, such that the call becomes blocked within the PBX.

SUMMARY OF THE INVENTION

According to the present invention, a system is provided for assigning a number which is designed to pass the screening test imposed by the COs, for identifying a physical location within a geographical area serviced by a PBX. A table is provided in the PBX (or a dedicated server connected thereto), for assigning a number associated with the telephone's physical location. The problem of emergency channel reservation is overcome according to the present invention by providing a channel allocation algorithm that always keeps one or more ISDN channels open for handling emergency calls.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
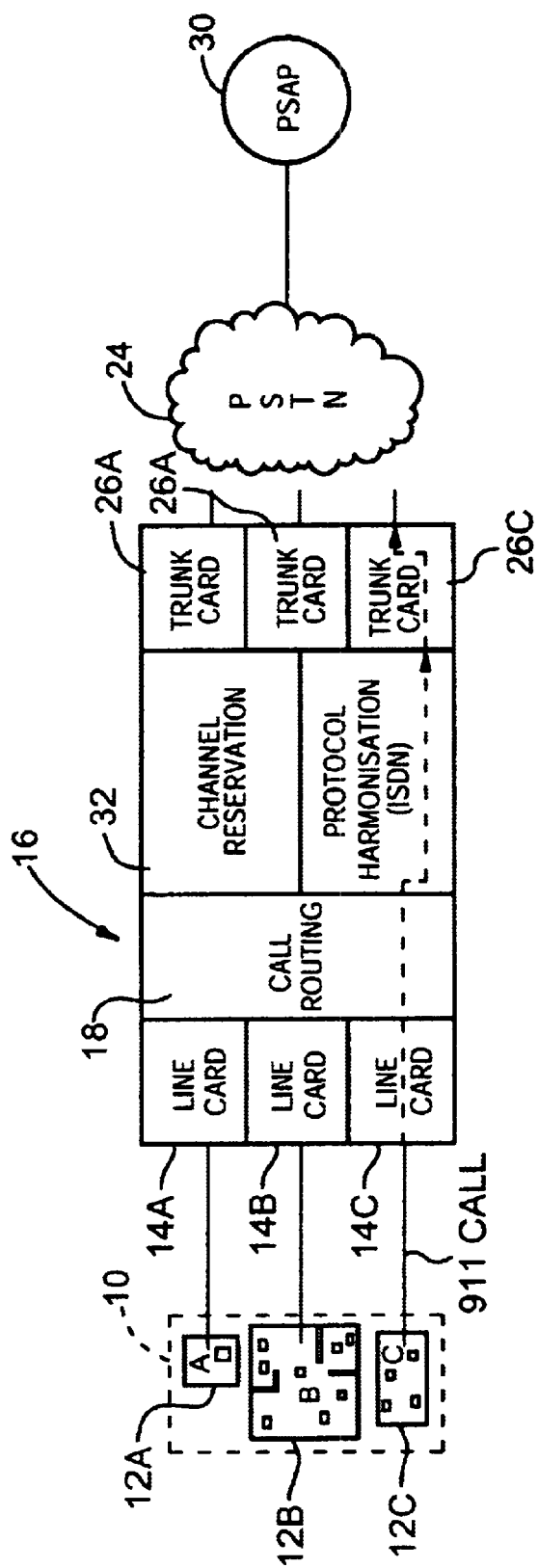
FIG. 1 is a block diagram of a system according to the present invention for providing identification information for a call requiring specific location identification by a call network.

FIG. 1 shows the basic configuration of the system according to the present invention. A plurality of users 10 are organized into individual call groups 12A, 12B, 12C, etc., identified by respective DID (Direct Inward Dialing) numbers or DN (Directory Number) numbers. The telephone extensions from the individual groups 12A, 12B, 12C, etc., are connected to line cards 14A, 14B, 14C, etc., of a PBX 16. The PBX 16 includes switching and call processing devices of a well-known nature, represented in FIG. 1 by call routing block 18. As discussed in greater detail below, after a DID number or DN has been assigned to a call, protocol harmonization takes place and the DID number or DN information is asserted via protocol harmonization block 22 for routing over the PSTN 24 via one of ISDN trunk cards 26A, 26B, 26C, etc.

It will be appreciated by a person of ordinary skill in the art that it is not essential whether DID or DN numbers are used. A DN can be a DID number but is not necessarily a DID number. According to the present invention, as set forth in greater detail below, it is important only that a number (whether DID or DN) which has only local significance to a PBX 16 is translated into a number which has universal significance to the Public Switched Telephone Network (PSTN).

Channel reservation is controlled by a channel reservation block 32 which is in communication with call routing block 18 and trunk cards 26A, 26B, 26C, etc.

In operation, when an individual (for example one of the users in call group 12C) initiates an emergency call by dialing 911 or 9-911, the call routing software 18 recognizes that the call is an emergency call which requires urgent handling. The PBX maps one or more system specific extension numbers to an ITU-T E.164 number obtained from the local telephone operating company. Each ITU-T E.164 number represents a location within a building or group of buildings served by the PBX 16. Thus, a single ITU-T E.164 number can represent multiple extension numbers that are in the same physical area. After the appropriate ITU-T E.164 number is derived, the ITU-T E.164 number is placed in the Calling Number Information Element of the Setup Message according to ITU-T recommendation Q.931, a copy of the relevant portion of which forms Appendix A to this specification. The Calling Party Number Presentation Indicator is set to "Presentation Allowed", the Bearer Capability Information Element Information transfer capability is set to "Speech" and the call is routed to one of either a ISDN PRI or BRI interface (i.e. an appropriate one of the trunks 26A, 26b, 26C, etc.).

If a PRI interface is used and all trunks are part of a call-by-call group, a channel reservation system 32 is provided to ensure that trunks are allocated for emergency calls. The algorithm keeps track of the total number of trunks/channels available on the system and the number in use at any time. Once usage exceeds a preset threshold level, which is adjustable depending on the number of lines served by the PBX 16, a busy signal is generated for any incoming or outgoing call requests other than those requesting 911 service. A flowchart of the detailed steps according to the channel reservation system is provided as FIG. 2.

Figure 2A:
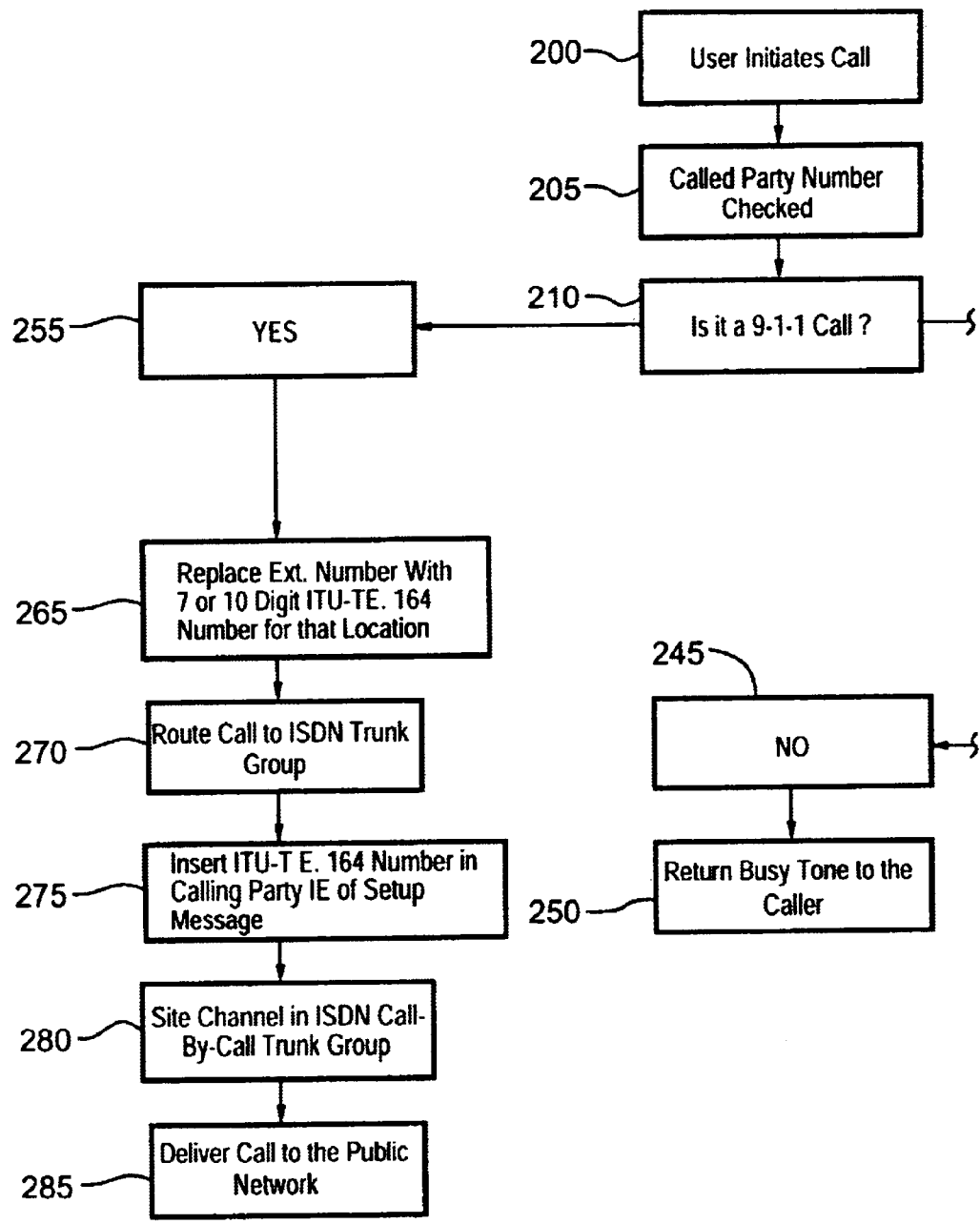
FIG. 2 is a flowchart showing operation of the system according to FIG. 1.
Figure 2B:
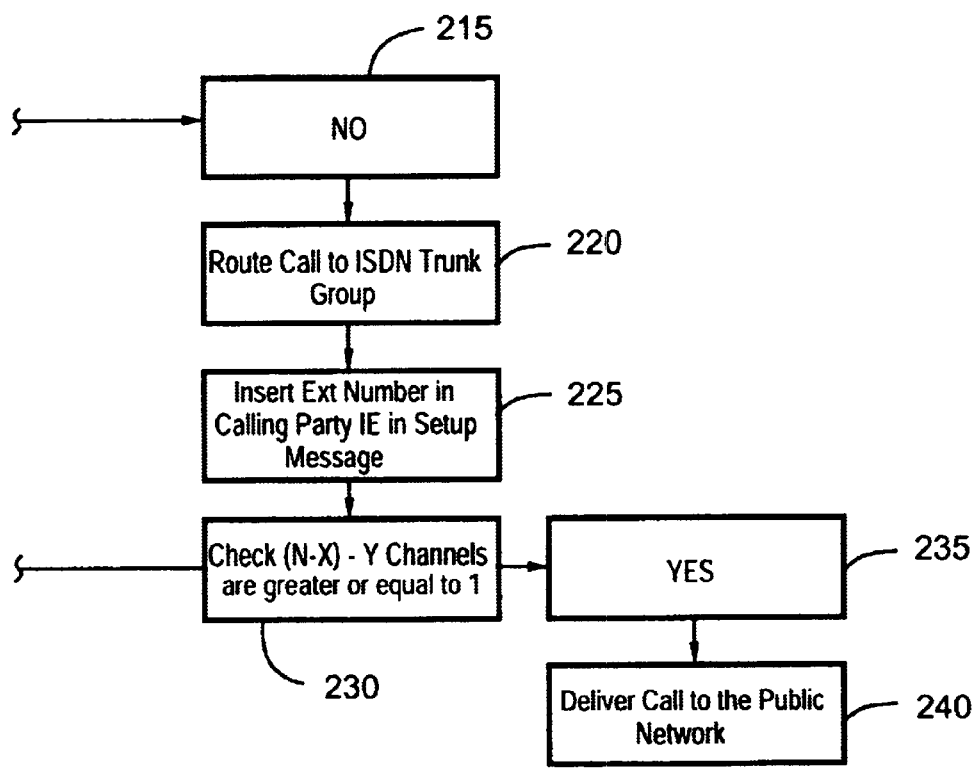

According to the flowchart of FIG. 2, upon user initiation of a call (Step 200), the PBX 16 checks to determine what number has been dialed (Step 205). Specifically, a determination is made as to whether the dialed number represents an emergency 911 call (Step 210).

In the event that the call is not an emergency 911 call (Step 215), the call is routed to an ISDN trunk group (Step 220), the extension number is inserted in the calling party information element in the setup message (Step 225) and the number of channels available is checked (Step 230).

Specifically, in Step 230, N is used to designate the total number of channels available in a call-by-call group, X designates the minimum number of channels that must be kept open for 911 call traffic, and Y is the number of channels in use at any time. Thus, the number Y represents calls of several types of traffic such as incoming, outgoing, 800, tie, foreign exchange, etc., each type typically having a minimum or maximum limit attached to the number of channels that can be occupied or reserved for the traffic type. However, since 911 is the highest priority traffic, all other traffic has been designated in this example by the value Y. Thus, in Step 230, the formula for determining whether or not to return a busy signal or to allow a call to proceed is: If (N−X)−Y is equal to or greater than 1, the call will be accepted (Steps 235 and 240). If the value is less than 1, a busy signal is returned to the caller (Steps 245 and 250).

If the call is determined to be an emergency 911 call (Step 255), the extension number is translated to a 7 or 10-digit ITU-T E.164 number for that location (Step 265), and the call is routed to an ISDN trunk group (Step 270). The DID number is inserted in the calling party information element field of the setup message (Step 275), and the channel size is determined in the ISDN call-by-call trunk group (Step 280). Finally, the call is delivered to the public network (Step 285).

An alternative to the channel reservation algorithm discussed with reference to FIG. 2, is to permanently assign one or more trunks/channels for 911 use. In systems where redundancy for signaling of the location information is required, the backup D-channel feature can be used. The D-channel is used to set up the call to the Emergency Service and it also carries the E.164 number which is then used to identify the location of the caller. Therefore, if for any reason the D-channel fails, the call will also fail and the location information will not be delivered.

Alternatives and variations of the invention are possible within the sphere and scope of the claims appended hereto.

What is claimed is:

1. A system for handling a call requiring emergency processing to a call answer point and for providing information on location of origination concerning said call via a public network to said call answer point wherein said call includes an extension call which is identified by an internally specified number having local significance to a PBX, comprising:

call routing means within said PBX for identifying said call as requiring emergency processing and in response providing a priority routing for said call;

translation table means within said PBX for receiving said call having the local significance to the PBX via said priority routing and in response assigning a predetermined designation having universal significance to said public network for indicating said information on location of origination of said call;

protocol harmonization means within said PBX for formatting said call for digital transmission to said call answer point, including inserting said predetermined designation in an information portion of said digital transmission; and digital interface means within said PBX for receiving said call properly formatted for said digital transmission and in response transmitting said call via said public network to said call answer point, whereupon said call answer point ascertains the location of origination of said call from said predetermined designation.

2. The system of claim 1, further comprising channel reservation means within said PBX for monitoring activity level of said call routing means and in the event said activity level exceeds a predetermined amount then presenting a busy signal to all calls except calls which require said emergency processing.

3. The system of claim 1, wherein said digital interface means comprises a ISDN BRI trunk circuit.

4. The system of claim 2, wherein said channel reservation means monitors said activity level of said call routing means by calculating a result for (N−X)−Y, where N represents the total number of channels available in a call-by-call group, X represents the number of channels that must be kept open for calls requiring said emergency processing, and Y represents the number of channels in use at any time, wherein said busy signal is presented in the event that said result is less than 1.

5. A method for handling a call requiring emergency processing to call answer point and for providing physical location information concerning said call to said call answer point, comprising the steps of:

identifying said call as requiring one of either emergency processing or standard processing;

in the event that said call has been identified as a call requiring standard processing then routing said call to a trunk group connected to a public network, inserting an extension number from which said call originates in a calling party information element field of a setup message for said call over said trunk group, monitoring call activity level and in the event said activity level exceeds a predetermined amount then presetting a busy signal to said call, and otherwise delivering said call to said public network; and in the event that said call is identified as requiring emergency processing, then routing said call to a translation server for translation said extension number to an ITU-T E.164 number for identifying said location, routing said call to said trunk group, inserting said ITU-T E.164 number into said calling party information element filed of said setup message, sizing said channel in said trunk group and delivering said call to said public network.

\* \* \* \* \*